(12) United States Patent
Casagrande

(10) Patent No.: US 9,553,748 B2
(45) Date of Patent: Jan. 24, 2017

(54) SYNCHRONOUS DEMODULATOR ELECTRONIC CIRCUIT FOR PHASE MODULATION SIGNALS

(71) Applicant: The Swatch Group Research and Development Ltd, Marin (CH)

(72) Inventor: Arnaud Casagrande, Bole (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 14/645,917

(22) Filed: Mar. 12, 2015

(65) Prior Publication Data

US 2015/0263873 A1 Sep. 17, 2015

(30) Foreign Application Priority Data

Mar. 17, 2014 (EP) .................... 14160256

(51) Int. Cl.
*H04L 27/227* (2006.01)
*H04L 27/14* (2006.01)
*H04L 27/233* (2006.01)

(52) U.S. Cl.
CPC ........... *H04L 27/2271* (2013.01); *H04L 27/14* (2013.01); *H04L 27/227* (2013.01); *H04L 27/2273* (2013.01); *H04L 27/2334* (2013.01)

(58) Field of Classification Search
CPC ........ H04L 27/10; H04L 27/14; H04L 27/144; H04L 27/148; H04L 27/152; H04L 27/1525; H04L 27/18; H04L 27/22; H04L 27/227; H04L 27/2271; H04L 27/2272; H04L 27/2273; H04L 27/2334; H04L 27/2338; H04L 27/265; H04L 27/2652; H04L 27/2653; H04L 27/2655; H04L 27/2657; H04L 27/3818; H04L 27/3827; H04L 27/3836

(Continued)

(56) References Cited

U.S. PATENT DOCUMENTS 5,729,570 A * 3/1998 Magill ................. H04B 1/7085
370/204
5,732,113 A * 3/1998 Schmidl ............... H04L 5/0048
375/354

(Continued)

OTHER PUBLICATIONS

European Search Report issued Aug. 19, 2014 in European Application 14160256, filed on Mar. 17, 2014 ( with English Translation).

(Continued)

*Primary Examiner* — Young T Tse
(74) *Attorney, Agent, or Firm* — Oblon, McClelland, Maier & Neustadt, L.L.P.

(57) ABSTRACT

The synchronous demodulator electronic circuit for phase modulation signals includes, in a control loop, a discrete Fourier transform unit for receiving the phase modulation signal to be demodulated, and means of recovering the carrier frequency of the phase modulation signal, so that the discrete Fourier transform unit performs in combination the operations of mixing and low-pass filtering the sampled phase modulation signal with at least one frequency and phase adapted digital conversion signal to supply at least one demodulated signal at the output of the discrete Fourier transform unit.

12 Claims, 3 Drawing Sheets

(58) Field of Classification Search
USPC ....... 375/260, 261, 268, 269, 272, 273, 279, 375/280, 281, 320, 323, 326, 344; 329/304–308, 323, 325, 336, 345, 346, 329/358, 360, 361; 455/42, 46, 60, 75, 455/76, 205, 208, 209, 210
See application file for complete search history.

(56) References Cited

U.S. PATENT DOCUMENTS 7,778,361 B1 * 8/2010 Jahnke ................ H04L 27/2276
375/326
2004/0156309 A1 * 8/2004 Chadha ............... H04L 27/2662
370/208
2004/0196915 A1 * 10/2004 Gupta ................ H04L 27/2695
375/260
2012/0076507 A1 3/2012 Roberts et al.

OTHER PUBLICATIONS

Minjian Zhao et al. "Sampling Rate Conversion and Symbol Timing for OFDM Software Receiver", IEEE International Conference on Communications, Circuits and Systems and West Sino Expositions, vol. 1, 2002, 5 pages.
J. Mark Steber, "PSK Demodulation", The Communications Edge, WJ Communications Inc., Tech Note, 2001, 6 pages.

* cited by examiner

SYNCHRONOUS DEMODULATOR ELECTRONIC CIRCUIT FOR PHASE MODULATION SIGNALS

This application claims priority from European Patent Application No. 14160256.5 filed Mar. 17, 2014, the entire disclosure of which is incorporated herein by reference.

FIELD OF THE INVENTION

The invention concerns a synchronous demodulator circuit for phase modulation signals.

BACKGROUND OF THE INVENTION

Phase modulation of a data signal to be transmitted may be BPSK (binary phase shift keying) or QPSK (quadrature phase shift keying), or OQPSK (offset quadrature phase shift keying) digital modulation. In the first case, BPSK digital modulation is defined with two phase values or states with a phase shift of 180° between the two phase states. In the second case, QPSK digital modulation is defined with four phase values or states with a phase shift of 90° between each phase state. This modulation in the transmitter usually uses two quadrature carrier signals phase-shifted by 90° from each other before frequency conversion for the transmission of a QPSK modulated signal. In the third case, OQPSK digital modulation is similar to QPSK digital modulation, but can be more advantageous in the event of amplifier non-linearities in the modulation chain.

By way of illustration, this type of QPSK modulation signal is represented in the time domain in FIG. 1. FIG. 1 shows the 2-bit encoding by phase shift keying of an in-phase data signal I and of a quadrature data signal Q phase-shifted by 90° from in-phase data signal I. For transmission of a phase modulation signal, data signals I and Q are added together. The data flow is defined by $1/T_s$, where $T_s$ is the duration of an encoding state.

Demodulation of this type of digital phase modulation signal can be performed synchronously in a phase modulation signal receiver. Demodulation can generally take place after at least a first frequency conversion of the phase modulation signal captured by an antenna of the receiver. To enable phase demodulation in synchronous mode, it is necessary to recover the carrier frequency of an intermediate signal, or of a signal directly captured by the antenna.

Recovery of the carrier frequency makes it possible to extract the modulating signal. To achieve this, it is known to use a Costas loop to recover the carrier frequency, in order to extract the modulating signal. Demodulation of a phase modulation signal is also explained in the article entitled "PSK Demodulation (Part I)" by J. Mark Steber in The Communications Edge by WJ Communications, Inc, revised in 2001.

FIG. 2 shows a diagram or constellation of the phase states of a QPSK modulation signal. The phase states are shown in polar coordinates relative to a real axis for in-phase data signal I and an imaginary axis for quadrature data signal Q. If the carrier frequency of at least one conversion signal of the electronic circuit is not equal to the carrier frequency of the phase modulation signal to be demodulated, there remains a phase error $\phi$. This carrier frequency must be recovered exactly in the electronic circuit in order to be able to demodulate the phase modulation signal in a control loop, and to correct the phase as explained hereafter. After recovering the carrier frequency, the modulating signal can be extracted, which corresponds to points 11, 10, 00 or 01 shown in FIG. 2.

In a known electronic demodulation circuit for a phase modulation signal as shown in FIG. 3, the intermediate frequency signal IF is provided both to a first signal mixer 2, and to a second signal mixer 3. Frequency conversion of the intermediate frequency signal IF is performed in the first and second mixers 2, 3 with oscillating signals. A first non-phase-shifted oscillating signal, which originates from a voltage controlled oscillator (VCO) 8 is provided to first mixer 2, and a second oscillating signal, which is phase-shifted by 90° in a phase shifter 9 and which originates from VCO oscillator 8, is provided to second mixer 3. The output of first mixer 2 provides an in-phase baseband signal I, while the output of second mixer 3 provides a quadrature baseband signal Q. Filtering is performed on the in-phase and quadrature signals by two low-pass filters 4 and 5 to provide an in-phase data signal $I_{OUT}$ and a quadrature data signal $Q_{OUT}$.

If the phase and frequency of the oscillating signals are not quite equal to the phase and frequency of the carrier of intermediate signal IF, there remains a frequency and phase error. A phase comparator 6 is thus used to compare in-phase data signal $I_{OUT}$ and quadrature signal $Q_{OUT}$. The phase error is provided through a loop filter 7, which is a standard filter such as an integrator, to the input of voltage controlled oscillator 8 in a Costas loop. Analogue or digital embodiment of the Costas loop requires low-pass filters, which have the disadvantage of becoming cumbersome, when their cut-off frequency is low.

SUMMARY OF THE INVENTION

It is therefore an object of the invention to provide a synchronous demodulator electronic circuit for phase modulation signals, making it possible to perform synchronous data demodulation in order to reduce the complexity, size and power consumption of the usual device.

To this end, the invention concerns a synchronous demodulator electronic circuit for phase modulation signals, wherein the electronic circuit includes, in a control loop, a discrete Fourier transform unit for receiving the phase modulation signal to be demodulated, and means of recovering the carrier frequency of the phase modulation signal, so that the discrete Fourier transform unit performs in combination the operations of mixing and low-pass filtering the sampled phase modulation signal with at least one frequency and phase adapted digital conversion signal to supply at least one demodulated signal at the output of the discrete Fourier transform unit.

Particular embodiments of the electronic circuit are defined in the dependent claims 2 to 9.

One advantage of the electronic circuit lies in the fact that instead of the conventional at least one mixer and at least one low-pass filter, there is provided a discrete Fourier transform unit, which combines the mixing and low-pass filtering operations. With the discrete Fourier transform unit, it is therefore possible to perform digital demodulation of the phase modulation signal to provide at least one demodulated signal, wherein the carrier frequency of the phase modulation signal has been removed.

Advantageously, the discrete Fourier transform is performed at a single frequency, which makes it possible to simplify the production of digital filters in the electronic circuit control loop.

BRIEF DESCRIPTION OF THE DRAWINGS

The objects, advantages and features of the synchronous demodulator electronic circuit for phase modulation signals, will appear more clearly in the following description, based on a simplified, non-limiting embodiment illustrated by the drawings, in which.

DETAILED DESCRIPTION OF THE INVENTION

In the following description, all those electronic components of the synchronous demodulator electronic circuit for phase modulation signals that are well known to those skilled in this technical field will be described only in a simplified manner.

Figure 4:
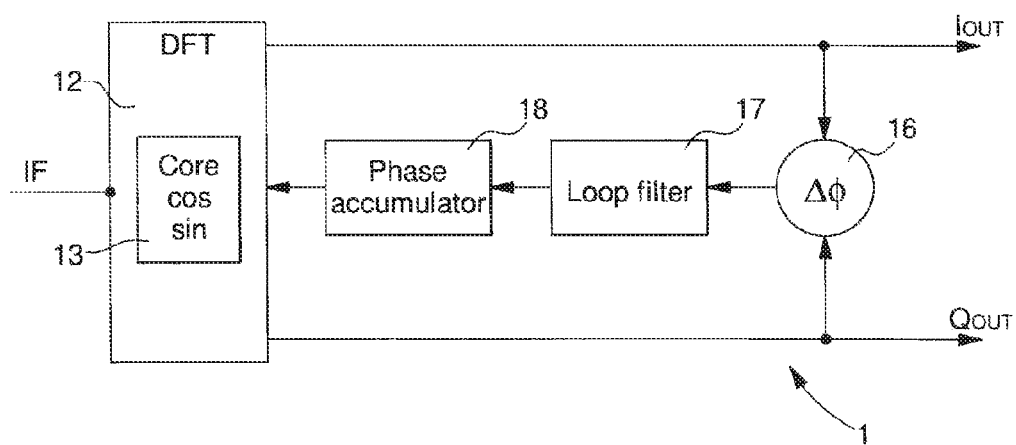
FIG. 4 shows a simplified view of the components of the synchronous demodulator electronic circuit for QPSK modulation signals according to the invention, which is provided with a digital Costas loop.

FIG. 4 shows an electronic circuit 1 provided with a synchronous demodulator for phase modulation signals. This electronic circuit 1 may form part, for example, of a phase modulation signal receiver or of a phase modulation signal receiving and transmission system, which are not shown. The phase modulation signal receiving and transmission system, which includes at least one electronic circuit 1 provided with a synchronous demodulator, may be a system with a low data flow and high sensitivity. Data or commands can be phase modulated in the phase modulation signal to be transmitted and received.

Electronic circuit 1 includes a defined discrete Fourier transform unit (DFT) 12 which receives an in-phase modulation signal IF for synchronous digital demodulation of the phase modulation signal. This discrete Fourier transform unit 12 makes it possible to perform both mixing and low-pass filtering operations as a result of the filtering and orthogonality properties of the discrete Fourier transform. Said discrete Fourier transform unit 12 includes a core 13 via which the mixing operation is performed with the phase modulation signal IF received and sampled in the discrete Fourier transform unit. Core 13 of discrete Fourier transform unit 12 includes a memory with a look-up table with various digital conversion signals at different frequencies, which are digital cosine and/or sine signals selectively addressable for the mixing operation with the sampled phase modulation signal IF. This mixture makes it possible to remove the carrier frequency from the phase modulation signal and to output at least one demodulated signal.

During the discrete Fourier transform, low-pass filtering is performed on at least one demodulated signal via core 13 by means of a temporal sampling window of defined duration. This filtering therefore takes the form of a sinc(f) after a windowing operation based on a single frequency of the discrete Fourier transform. The longer the duration of the determined temporal window for performing filtering, the lower the low-pass filter cutoff frequency will be, and vice versa for a shorter temporal window duration. A discrete Fourier transform at a single frequency, which corresponds to the carrier frequency of the phase modulation signal, simplifies digital low-pass filtering.

The frequency of the selected cosine and/or sine signals of core 13 of discrete Fourier transform unit 12 is not generally directly equal to the carrier frequency of phase modulation signal IF for the mixing operation in core 13. Recovery of this carrier frequency must be performed in electronic circuit 1. The carrier frequency must be adapted in a control loop of the electronic circuit by carrier frequency recovery means 16, 17, 18 as well as the phase. The control loop may be a digital Costas loop.

The control loop of electronic circuit 1 includes a frequency and/or phase extraction unit 16 which may be a phase comparator 16. This phase comparator 16 receives at least one demodulated signal from discrete Fourier transform unit 12. The demodulated signal directly represents information about the phase and therefore also data that can be used without subsequent treatment. This phase comparator can thus be considered to be a frequency and/or phase extractor. If a phase error remains in the demodulated signal, phase error information is provided through a loop filter 17 to a phase accumulator 18. This phase accumulator can directly address core 13 of discrete Fourier transform unit 12 as a phase increment, in order to select cosine and/or sine signals at a suitable frequency according to the phase increment. Phase and frequency adaptation is digitally performed until phase lock, like frequency lock in the digital Costas loop.

Figure 3:
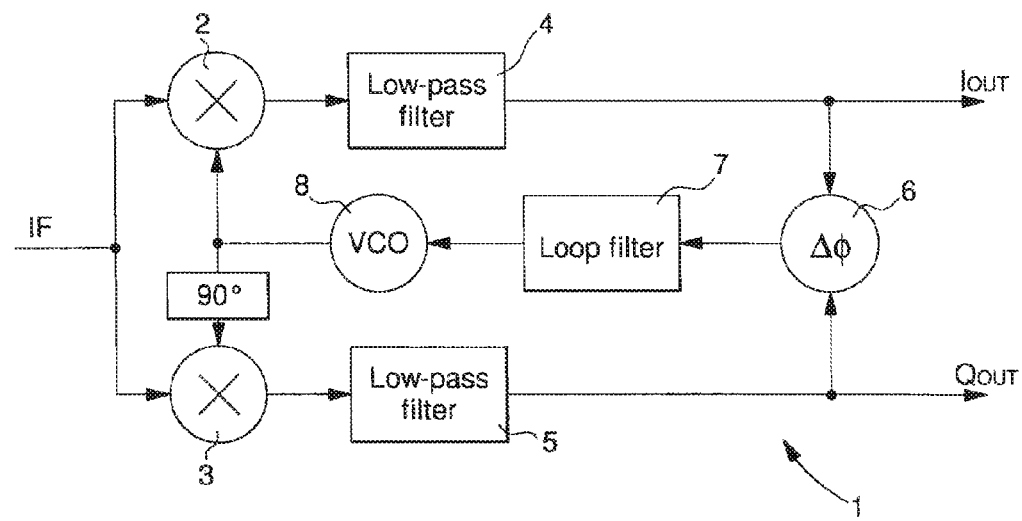
FIG. 3, already cited, shows a simplified view of the components of the synchronous demodulator electronic circuit for phase modulation signals, which is provided with a prior art Costas loop.

The combination of this phase accumulator 18 and core 13 may be considered equivalent to a conventional oscillator like the voltage controlled oscillator shown in FIG. 3 of the analogue demodulation electronic circuit for phase modulation signals. However, demodulation in the electronic circuit of the present invention is performed digitally via discrete Fourier transform unit 12.

Electronic circuit 1 of the present invention may be configured for synchronous digital demodulation of a BPSK modulation signal but also of a QPSK or OQPSK modulation signal as shown in FIG. 4. In that case, a first demodulated in-phase signal $I_{OUT}$ and a second demodulated quadrature signal $Q_{OUT}$ are provided at the output of discrete Fourier transform unit 12. The first demodulated in-phase signal $I_{OUT}$ is obtained by mixing and low-pass filtering of phase modulation signal IF and of an addressed cosine signal from core 13 in discrete Fourier transform unit 12. The second demodulated quadrature signal $Q_{OUT}$ is obtained by mixing and low-pass filtering of phase modulation signal IF and of an addressed sine signal from core 13 in discrete Fourier transform unit 12. Phase comparator 16 can thus compare the first and second demodulated signals $I_{OUT}$ and $Q_{OUT}$. A phase error is provided to phase accumulator 18 via loop filter 17. A phase increment corresponding to the phase error of phase comparator 16 is provided to core 13 of unit 12 to address core 13 and select a cosine signal and a sine signal at a corrected frequency.

For the digital mixing and low-pass filtering operations, a so-called "sliding" discrete Fourier transform is performed. The temporal window of duration T is successively shifted in time with each shifting duration t, where duration t is shorter than duration T, in particular at least 4 times shorter. This may also depend on the signal sampling frequency in discrete Fourier transform unit 12 which is generated by a clocking signal from a stage oscillator, which may be external to said unit 12. This sampling frequency must be at least twice the carrier frequency and preferably at least four times greater. For example, for a 400 kHz carrier frequency, a sampling frequency of at least more than 800 kHz is required.

Figure 5:
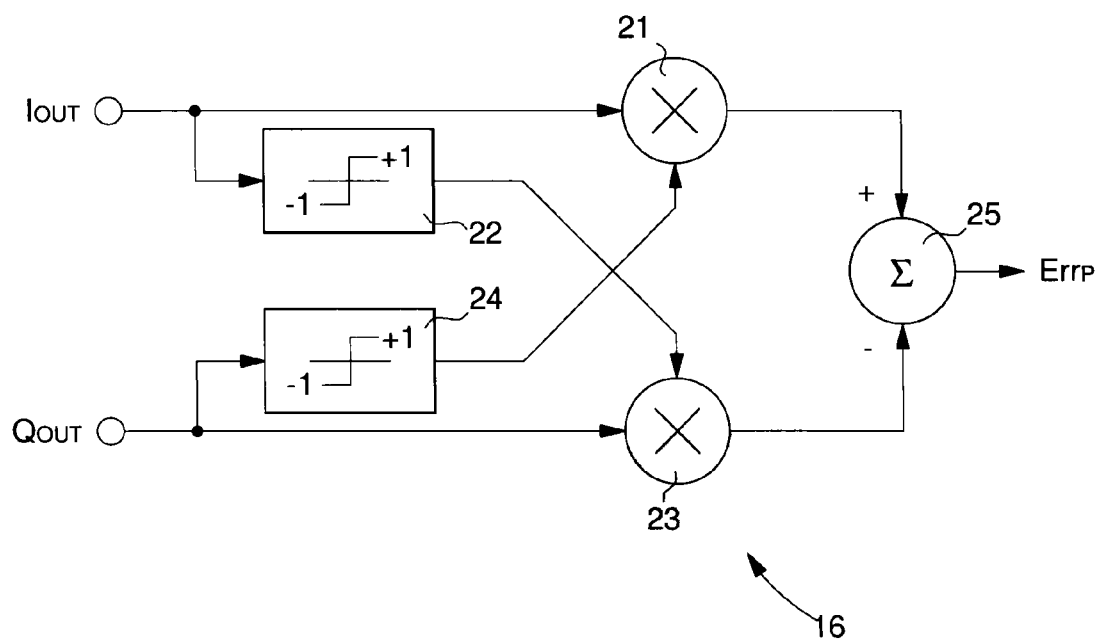
FIG. 5 shows a simplified view of an embodiment of a phase comparator of the electronic circuit of FIG. 4 to compare the demodulated in-phase signal with the demodulated quadrature signal according to the invention.

To perform the comparison of demodulated in-phase signal $I_{OUT}$ and quadrature signal $Q_{OUT}$, a phase comparator 16 may be used as shown in FIG. 5. This phase comparator 16 includes a first multiplier 21 receiving at a first input the demodulated in-phase signal $I_{OUT}$ and a second multiplier 23 receiving at a first input the demodulated quadrature signal $Q_{OUT}$. The demodulated in-phase signal $I_{OUT}$ is connected to a first sign indicator 22, and demodulated quadrature signal $Q_{OUT}$ is connected to a second sign indicator 24. The output of first sign indicator 22 is provided to a second input of second multiplier 23, while the output of second sign indicator 24 is provided to a second input of first multiplier 21.

The first and second sign indicators 22 and 24 are arranged to provide the sign of the demodulated in-phase $I_{OUT}$ and quadrature $Q_{OUT}$ signals. When the demodulated signal defines in time a high state, i.e. a logic state "1", the sign at the indicator output is positive +1. When the demodulated signal defines a low state in time, i.e. a logic state "0", the sign at the indicator output is negative −1.

The purpose of first multiplier 21 is to change the sign of demodulated in-phase signal $I_{OUT}$, if second indicator 24 provides a negative sign, and the purpose of second multiplier 23 is to change the sign of demodulated quadrature signal $Q_{OUT}$, if first indicator 22 provides a negative sign. No change of sign is made if the first and second sign indicators 22, 24 provide a positive sign to the corresponding multiplier 21, 23.

In phase comparator 16, the output of first multiplier 21 is connected to a positive input of an adder 25 and the output of second multiplier 23 is connected to a negative input of adder 25. The adder delivers a phase error signal $Err_p$ in the digital Costas loop after the comparison of demodulated in-phase signal $I_{OUT}$ and demodulated quadrature signal $Q_{OUT}$.

Figure 1:
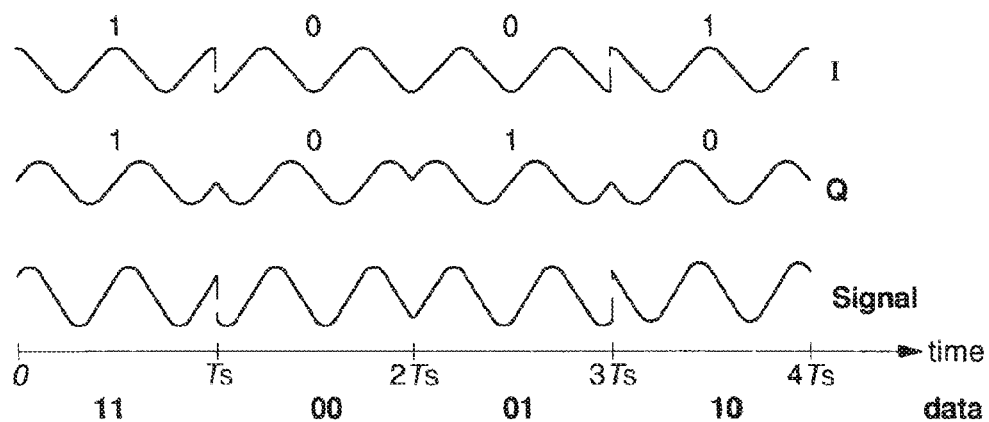
FIG. 1, already cited, shows a time graph of a QPSK modulation signal indicating the encoding obtained by an in-phase modulating signal and a quadrature modulating signal.
Figure 2:
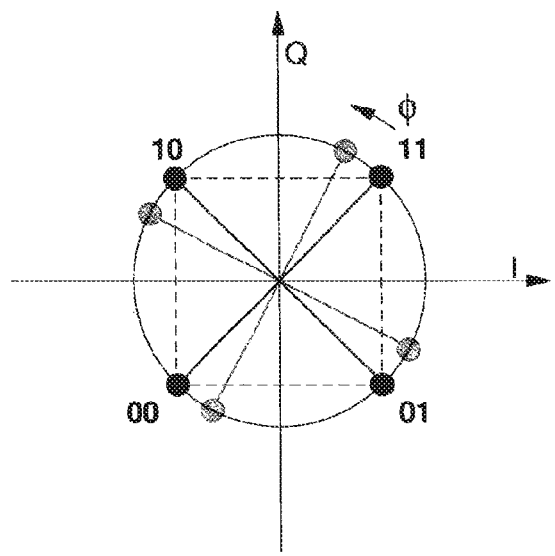
FIG. 2, already cited, shows a phase state diagram in polar coordinates of a QPSK modulation signal.

As shown in FIG. 2 described above, the phase error φ may vary with each sliding discrete Fourier transform, if the local oscillator frequency has not been corrected. Depending on the comparison of demodulated in-phase signal $I_{OUT}$ and quadrature signal $Q_{OUT}$ in phase comparator 16, the phase accumulator will address the core of the Fourier transform unit to adapt the carrier frequency and phase. This adaptation is successively performed until the carrier frequency has been recovered and there is phase and frequency lock in the digital Costas loop.

From the description that has just been given, several variants of the synchronous demodulator electronic circuit for phase modulation signals can be devised by those skilled in the art without departing from the scope of the invention defined by the claims. The synchronous demodulator electronic circuit may be arranged to demodulate a 3-bit or more phase modulation signal. The phase modulation signal provided to the electronic circuit may have undergone a first frequency conversion in previous mixers of a receiver in which the electronic circuit is placed.

What is claimed is:

1. A synchronous demodulator electronic circuit for phase modulation signals, wherein the electronic circuit comprises:
   in a control loop, discrete Fourier transform circuitry configured to receive a phase modulation signal to be demodulated, and circuitry configured to recover a carrier frequency of the phase modulation signal, said circuitry configured to recover the carrier frequency including phase extraction circuitry configured to receive at least one demodulated signal at an output of the discrete Fourier transform circuitry, a loop filter connected to an output of the phase extraction circuitry, and a phase accumulator connected to an output of the loop filter, to control a carrier frequency adaptation in the discrete Fourier transform circuitry, so that the discrete Fourier transform circuitry is configured to perform in combination operations of mixing and low-pass filtering a sampled phase modulation signal with at least one frequency and a phase adapted digital conversion signal to supply the at least one demodulated signal at the output of the discrete Fourier transform circuitry, and
   wherein the discrete Fourier transform circuitry is further configured to perform digital low-pass filtering by a temporal sampling window of defined duration for a discrete Fourier transform.

2. The electronic circuit according to claim 1, wherein the phase extraction circuitry is a phase comparator.

3. The electronic circuit according to claim 1, wherein the discrete Fourier transform circuitry includes a core provided with a memory with a look-up table with various different digital conversion signals at different frequencies, which are at least one of digital cosine and sine signals, each digital conversion signal of the memory being selectively addressable by the phase accumulator for the mixing operation with the sampled phase modulation signal.

4. The electronic circuit according to claim 1, wherein the discrete Fourier transform circuitry is further configured to perform a sliding Fourier transform at a single frequency corresponding to the carrier frequency of the phase modulation signal.

5. The electronic circuit according to claim 1, wherein the phase extraction circuitry is a phase comparator, and
   wherein the discrete Fourier transform circuitry is further configured to provide a demodulated in-phase signal and a demodulated quadrature signal on the basis of a QPSK or OQPSK modulation signal.

6. The electronic circuit according to claim 5, wherein the phase comparator enables the demodulated in-phase signal and the demodulated quadrature signal to be compared to provide a phase error signal to the loop filter and to the phase accumulator.

7. The electronic circuit according to claim 6, wherein the phase comparator includes a first multiplier receiving at a first input the demodulated in-phase signal, which is supplied to a first sign indicator, a second multiplier receiving at a first input the demodulated quadrature signal, which is supplied to a second sign indicator, an output of the first sign indicator being supplied to a second input of the second multiplier in order to change a sign of the demodulated quadrature signal according to an output state of the first sign indicator, whereas an output of the second sign indicator is supplied to a second input of the first multiplier so as to change a sign of the demodulated in-phase signal according to an output state of the second sign indicator, and wherein an output of the first multiplier is connected to a positive input of an adder, whereas an output of the second multiplier is connected to a negative input of the adder, which supplies the phase error signal.

8. A synchronous demodulator electronic circuit for phase modulation signals, wherein the electronic circuit comprises:
   in a control loop, discrete Fourier transform circuitry configured to receive a phase modulation signal to be demodulated, and circuitry configured to recover a carrier frequency of the phase modulation signal and control a carrier frequency adaptation in the discrete Fourier transform circuitry, so that the discrete Fourier transform circuitry is configured to perform in combination operations of mixing and low-pass filtering a sampled phase modulation signal with at least one frequency and a phase adapted digital conversion signal to supply at least one demodulated signal at an output of the discrete Fourier transform circuitry, and wherein the discrete Fourier transform circuitry is further configured to perform digital low-pass filtering by a temporal sampling window of defined duration for a discrete Fourier transform.

9. The electronic circuit according to claim 8, wherein the discrete Fourier transform circuitry is further configured to perform a sliding Fourier transform at a single frequency corresponding to the carrier frequency of the phase modulation signal.

10. A synchronous demodulator electronic circuit for phase modulation signals, wherein the electronic circuit comprises:

in a control loop, discrete Fourier transform circuitry configured to receive a phase modulation signal to be demodulated, and circuitry configured to recover a carrier frequency of the phase modulation signal, said circuitry configured to recover the carrier frequency including phase extraction circuitry configured to receive at least one demodulated signal at an output of the discrete Fourier transform circuitry, a loop filter connected to an output of the phase extraction circuitry, and a phase accumulator connected to an output of the loop filter, to control a carrier frequency adaptation in the discrete Fourier transform circuitry, so that the discrete Fourier transform circuitry is configured to perform in combination operations of mixing and low-pass filtering a sampled phase modulation signal with at least one frequency and a phase adapted digital conversion signal to supply the at least one demodulated signal at the output of the discrete Fourier transform circuitry, wherein the phase extraction circuitry is a phase comparator, wherein the discrete Fourier transform circuitry is further configured to provide a demodulated in-phase signal and a demodulated quadrature signal on the basis of a QPSK or OQPSK modulation signal, wherein the phase comparator enables the demodulated in-phase signal and the demodulated quadrature signal to be compared to provide a phase error signal to the loop filter and to the phase accumulator, and wherein the phase comparator includes a first multiplier receiving at a first input the demodulated in-phase signal, which is supplied to a first sign indicator, a second multiplier receiving at a first input the demodulated quadrature signal, which is supplied to a second sign indicator, an output of the first sign indicator being supplied to a second input of the second multiplier in order to change a sign of the demodulated quadrature signal according to an output state of the first sign indicator, whereas an output of the second sign indicator is supplied to a second input of the first multiplier so as to change a sign of the demodulated in-phase signal according to an output state of the second sign indicator, and wherein an output of the first multiplier is connected to a positive input of an adder, whereas an output of the second multiplier is connected to a negative input of the adder, which supplies the phase error signal.

11. The electronic circuit according to claim 10, wherein the discrete Fourier transform circuitry includes a core provided with a memory with a look-up table with various different digital conversion signals at different frequencies, which are at least one of digital cosine and sine signals, each digital conversion signal of the memory being selectively addressable by the phase accumulator for the mixing operation with the sampled phase modulation signal.

12. The electronic circuit according to claim 10, wherein the discrete Fourier transform circuitry is further configured to perform a sliding Fourier transform at a single frequency corresponding to the carrier frequency of the phase modulation signal.

* * * * *